US007005401B2

(12) United States Patent
Lu et al.

(10) Patent No.: US 7,005,401 B2

(45) Date of Patent: Feb. 28, 2006

(54) METHOD OF PREPARATION OF NON-PLATINUM COMPOSITE ELECTROCATALYST FOR CATHODE OF FUEL CELL

(75) Inventors: Tianhong Lu, Changchun (CN); Xuguang Li, Changchun (CN); Wei Xing, Changchun (CN)

(73) Assignees: Changchun Institute of Applied Chemistry, Changchun (CN); Chinese Academy of Science, Changchun (CN)

(*) Notice: Subject to any disclaimer, the term of this patent is extended or adjusted under 35 U.S.C. 154(b) by 198 days.

(21) Appl. No.: 10/612,336

(22) Filed: Jul. 3, 2003

(65) Prior Publication Data

US 2004/0058808 A1 Mar. 25, 2004

(30) Foreign Application Priority Data

Jul. 9, 2002 (CN) .............................. 02123898 A

(51) Int. Cl.

*H01M 4/88* (2006.01)
*H01M 4/86* (2006.01)
*B01J 21/18* (2006.01)
*B01J 31/00* (2006.01)

(52) U.S. Cl. ...................... 502/182; 502/101; 502/152; 502/153; 502/154; 429/42; 429/43; 429/44

(58) Field of Classification Search ................ 502/101, 502/182, 152–154; 429/42–44

See application file for complete search history.

(56) References Cited

U.S. PATENT DOCUMENTS 3,505,118 A * 4/1970 Mehra et al. ................. 429/13
3,821,028 A * 6/1974 Ziener et al. ................. 429/43
4,806,514 A * 2/1989 Langford et al. ........... 502/159
5,292,409 A * 3/1994 Dixon et al. ................ 588/303
5,521,020 A * 5/1996 Dhar ........................... 429/42
5,552,245 A * 9/1996 Li et al. ..................... 429/188
5,733,677 A * 3/1998 Golovin et al. ............... 429/27
2003/0166921 A1* 9/2003 Therien et al. ............. 540/145
2003/0170519 A1* 9/2003 Mittelstadt et al. ........... 429/30

FOREIGN PATENT DOCUMENTS

WO WO 2004/089525 * 10/2004

* cited by examiner

*Primary Examiner*—J. A. Lorengo
*Assistant Examiner*—Patricia L. Hailey
(74) *Attorney, Agent, or Firm*—Ann S. Hobbs; Venable LLP

(57) ABSTRACT

A method of preparing non-platinum composite electrocatalyst for a fuel cell cathode, comprising: (1) preparing a carbon supporting titanium dioxide; (2) compounding the carbon supporting titanium dioxide with a transition metal macrocyclic compound in an organic solvent to produce a carbon supporting titanium dioxide-transition metal macrocyclic compound comprising 0.1–5 g/L of macrocyclic compound; and (3) thermal treating the resulting compound in step (2) at 100–1000° C. to produce a composite catalyst. The composite catalyst prepared with the method according to the present invention also has the advantages of better resistance to methanol and lower cost over the Pt/C catalyst. The said composite catalyst would have better prospects in application.

7 Claims, 1 Drawing Sheet

METHOD OF PREPARATION OF NON-PLATINUM COMPOSITE ELECTROCATALYST FOR CATHODE OF FUEL CELL

FIELD OF THE TECHNOLOGY

The present invention relates to the method of preparation of non-platinum composite electrocatalyst for the cathode of a fuel cell.

BACKGROUND OF THE TECHNOLOGY

The proton exchange membrane fuel cell (PEMFC) is the first fuel cell that is put into practical use. It is also a fuel cell receiving increasing attention nowadays. That is due to the fact that the specific power and power density of PEMFC are higher than those of the other types of the fuel cells. In addition, since the operating temperature is low, PEMFC are suitable to be used as electric source for vehicles, as small stationary electric source and as portable electric source.

Compared with PEMFC, methanol is used in place of hydrogen as the fuel in a direct methanol fuel cell (DMFC). Except those that PEMFC possess, DMFC owns some other advantages. Therefore DMFC has the advantages that PEMFC has. Because methanol is abundant in resource, cheap in price and is a liquid convenient to be stored and carried, DMFC is more suitable to be used as a portable electric source in military and civil fields. Since the nineties of $20^{th}$ century, more and more attention has been gradually drawn to DMFC.

After nearly forty years of research on PEMFC, great breakthrough was made in the basic research as well as in the engineering fields. However, from the cost-effectiveness viewpoint, the properties of PEMFC are far below the commercial demands. One reason is the high price of the electrode catalyst and electrolyte membrane. At present, platinum and its alloy are mostly used in anode catalyst while platinum is used in cathode catalyst. Researches have shown that certain non-platinum catalyst can be used to replace cathode Pt/C catalyst whereas platinum must be used in an anode catalyst. On the other hand, there exists a so-called "methanol crossover" problem in DMFC. That is, methanol would permeate through the electrolyte membrane and enter the cathode, producing mixed potential and causing the lowering of the cell efficiency and the methanol utility. In order to lower the cost of PEMFC and DMFC, to reduce the consumption of the limited platinum resource on the earth and to eliminate the influence of "methanol permeation" on the performance of the cell, it is necessary and urgent to develop a non-platinum and methanol-resistant electrocatalyst for the cathode of a fuel cell. For the moment, the transition metal macrocyclic compound is one of the mostly studied methanol-resistant and non-platinum cathode electrocatalysts, especially the porphyrin or phthalocyanine compounds having Fe or Co as the central metal. The porphyrin or phthalocyanine compounds possess high catalytic activity for oxygen reduction as well as good resistance to methanol [S. Gupta, D. Tryk, S. K. Zecevic, W. Aldred, D. Guo, R. F. Savinell, J. Appl. Electrochem., 28, (1998) 673–682]. However, the stability of the catalysts is low, because hydrogen peroxide produced in the course of the oxygen reduction will corrode the active carbon carrier and transition metal macrocyclic compounds and deteriorate the performance, which affects their practical use adversely.

SUMMARY OF THE INVENTION

The objective of the present invention is to provide a method of preparation of the non-platinum, composite electrocatalyst for the fuel cell cathode. The composite catalyst prepared with the method according to the present invention has better stability in the course of oxygen reduction over the transition metal macrocyclic compound catalyst. The composite catalyst prepared with the method according to the present invention also has the advantages of better resistance to methanol and lower cost over the Pt/C catalyst.

In order to achieve the above-mentioned objective, the present invention provides a method of preparation of the non-platinum, composite electrocatalyst for the fuel cell cathode, comprising:

(1) preparing a carbon supporting titanium dioxide;

(2) compounding the carbon supporting titanium dioxide with a transition metal macrocyclic compound in an organic solvent to produce a carbon supporting titanium dioxide-transition metal macrocyclic compound comprising 0.1–5 g/L of macrocyclic compound; and (3) heat-treating the resulting compound in step (2) at 100–1000° C. to produce a composite catalyst.

In one preferred embodiment, the step (1) comprises the following substeps:

(1) slowly adding tetrabutyl titanate into anhydrous alcohol while vigorously stirring at room temperature to obtain a homogeneous and transparent solution;

(2) adding nitric acid into a mixture of deionized water and anhydrous alcohol to obtain a solution (B); and (3) slowly adding the solution (A) into the solution (B) while vigorously stirring to obtain a homogeneous and transparent sol.

Further, the present invention provides a composite catalyst prepared by the method according to the present invention.

DETAILED DESCRIPTION OF THE PREFERRED EMBODIMENTS

Figure 1:
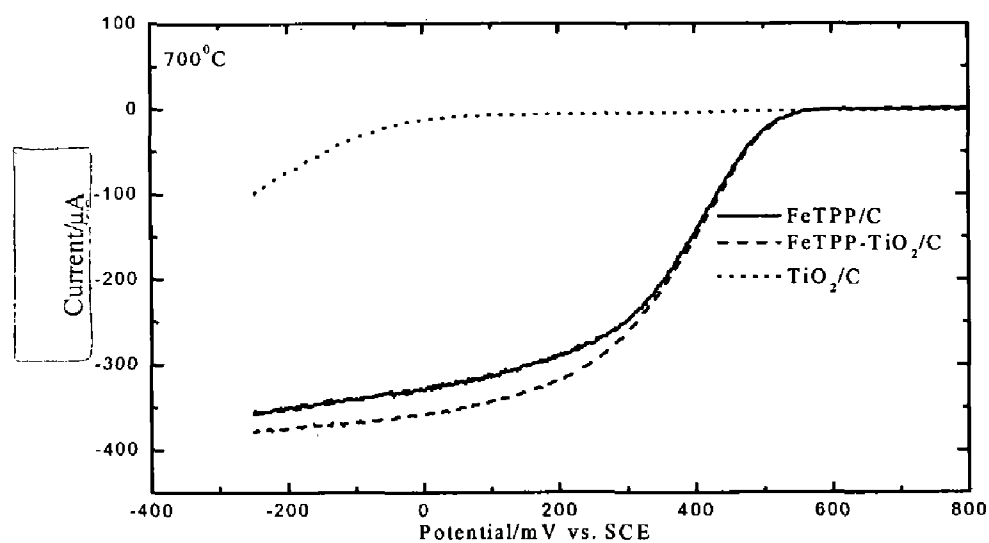
FIG. 1 shows a polarization curve of reduction of $O_2$ when heat treating the FeTPP/C, FeTPP-$TiO_2$/C and $TiO_2$/C electrodes.
Figure 2:
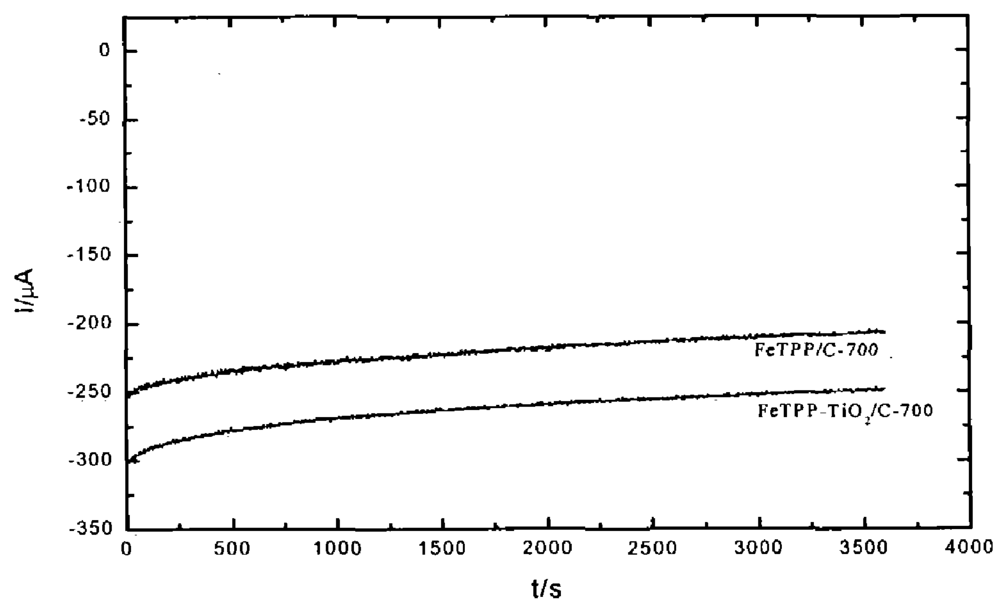
FIG. 2 shows a current vs time curve of reduction of $O_2$ when heat treating the FeTTP/C, FeTTP-$TiO_2$/C electrodes at different temperatures and 0.45V.

The term "macrocyclic compound" is meant to be those compounds having a Me—$N_4$ or $MeN_2O_2$ structure in which the four nitrogen atoms, or two nitrogen atoms and two oxygen atoms, surround and bond to the transition metal as a center (Me).

Preferably, the center metal ion of the transition metal macrocyclic compound in step (2) is selected from a group consisting of iron, cobalt, manganese, copper and zinc.

According to one preferred embodiment of the present invention, the transition metal macrocyclic compound is selected from a group consisting of porphyrin, phthalocyanine, Schiff base, annulene and derivatives thereof.

The term "sol-gel method" is meant to be a method comprising: converting a chloro-platinic acid into a complex of platinum followed by producing a platinum/carbon electrocatalyst therefrom. This method is disclosed in many documents, for example, H. bönnemann, W. Brijoux, R. Brinkman, E. Dinjus, T. Joussen and B. Korall, Angew. Chem. 103(1991), 1344.

The term "impregnation-deposition method" means a method comprising absorbing the chloro-platinic acid as the raw material into the apertures and onto the surfaces by capillarity followed by reducing the chloro-platinic acid using a reducing agent. This method is disclosed in many documents, for example, J. B. Goodenough, A. Hamnett, B. J. Kemmedy, et al. Electrochimica Acta, 15(1990), 199–207.

The transition metal macrocyclic compound and titanium dioxide are selected as the main components of the composite catalyst in the present invention. The former shall possess higher catalytic activity for oxygen reduction while the latter shall has semiconductor property and better ability to catalyze the decomposition of hydrogen peroxide. As soon as hydrogen peroxide is produced, it will be instantly decomposed by titanium dioxide of a carbon supporting titanium dioxide-transition metal macrocyclic compound which is prepared by the sol-gel method and the impregnation-deposition method. The compound is then thermal treated in the atmosphere of an inert gas to yield the composite catalyst.

According to one preferred embodiment of the present invention, the method of preparation comprises the following steps:

(1) Preparation of carbon supporting titanium dioxide: The volume ratio of the reactants can be, for example, tetrabutyl titanate:anhydrous ethanol:water:nitric acid=1:100:5:0.4 (volume ratio, based on the volumes of these components in the final mixture solution). Firstly, tetrabutyl titanate is slowly added into a part of, preferably half amount of, anhydrous ethanol with vigorous stirring at room temperature to obtain a homogeneous transparent solution (A). Nitric acid is added into a mixed solution of deionized water and the other anhydrous ethanol with vigorous stirring to obtain a solution (B). Then the solution (A) is slowly dropped into the solution (B) with vigorous stirring to obtain a homogeneous transparent sol. The sol is so blended with the active carbon that the content of the active carbon is 10–30 g/L. The resulting mixture is stirred and left aside until the completion of the gelating process. The gelled mixture is vacuum dried to yield a titanium dioxide supported on carbon black.

(2) Preparation of carbon supporting titanium dioxide-transition metal macrocyclic compound: the transition metal macrocyclic compound is dissolved in an organic solvent selected from a group consisting of N,N-dimethylformide, dimethylsulfoxide, cyclohexane, acetone, anhydrous pyridine and the like. The transition metal macrocyclic compounds include, but not limited to, porphyrin, phthalocyanine, Schiff base, annulene and derivatives thereof, respectively, containing iron, cobalt, manganese, copper or zinc as the central metal ions. The content of the macrocyclic compound is in the range of 0.1–5 g/L. The resulting solution of the macrocyclic compound is stirred. The titanium dioxide supported on carbon obtained in (1) is added into the solution while stirring. Then deionized water is added to the solution while stirring. The volume ratio of the deionized water to the organic solvent is in the range of 1–5:5-1. After filtration, the filtered product is washed with deionized water and then is vacuum dried. The mass percentage of the active carbon in the final carbon supporting titanium dioxide-transition metal macrocyclic compound product is in the range of 40–80%. The mass ratio of the transition metal macrocyclic compound to titanium dioxide is in the range of 1–10:3-1.

(3) Treatment of carbon supporting titanium dioxide-transition metal macrocyclic compound: The product obtained in (2) is thermally treated at 100–1100° C. under inert atmosphere such as argon or nitrogen for 0.5–6 hours and the carbon supporting transition metal macrocyclic compound-titanium dioxide composite catalyst is finally obtained.

The composite catalyst of carbon supporting titanium dioxide-transition metal macrocyclic compound of the invention has better stability over the transition metal macrocyclic compound catalyst. The composite catalyst of the invention has the advantages of better resistance to methanol and lower cost over the Pt/C catalyst. In particular, according to the present invention, the unfavorable effect of the limited platinum resource on the futural development of the fuel cell can be alleviated. Therefore there is bright prospect for the application of the composite catalyst in the present invention.

EXAMPLES

In the following examples, the electrochemical test was carried out by using the Model 273 Potentiostat (EG&G Company, USA), Model 616 Rotating Disk Electrode and the conventional three-electrodes system. 5 mg of catalyst and 0.4 ml of Nafion solution were added into a 2 mL eccentric tube, and then homogeneously mixed using ultrasonic wave. 5 $\mu$L of the resulting mixture was picked up by the microsyringe onto the surface of the glass/carbon electrode of a diameter of 5 mm, followed by naturally drying at the room temperature to obtain the working electrode. The saturated calomel electrode (SCE) was used as a reference electrode. The platinum sheet electrode was used as a counter electrode. 0.5 $moLL^{-1}H_2SO_4$ solution, or 0.5 $molL^{-1}H_2SO_4$ plus 1 $molL^{-1}CH_3OH$ solution, was used as the electrolyte. $O_2$ and $N_2$ were passed through the electrolyte for 15 min prior to the test and for the whole period of the test so as to protect the electrolyte. The speed of electric potential scanning is 10 $mVs^{-1}$. The scanning range is about from 1.05 to −0.25V. The difference between the recovered portion of the recycle volt-ampere curve obtained at 1000 rpm and saturated with $O_2$ and the recovered portion of the recycle volt-ampere curve obtained at 0 rpm and saturated with N2 represents the polarization curve. All tests were carried out at the temperature of 25±1° C.

Example 1

(1) Preparation of carbon supporting titanium dioxide: The volume ratio of the reactants is tetrabutyl titanate:anhydrous ethanol:water:nitric acid=1:100:5:0.4. Tetrabutyl titanate was slowly added into half amount of anhydrous ethanol with vigorous stirring at room temperature to obtain a homogeneous transparent solution (A). Nitric acid was added into a mixed solution of deionized water and other half amount of the anhydrous ethanol with vigorous stirring to obtain a solution (B). Then the solution (A) was slowly dropped into the solution (B) under vigorous stirring to obtain a homogeneous transparent sol. The sol was so blended with the active carbon that the content of the active carbon was 20 g/L. The mixture was stirred and left aside until the completion of the gelating process. The gelled product was vacuum dried to yield the carbon supporting titanium dioxide.

(2) Preparation of carbon supporting titanium dioxide-transition metal macrocyclic compound: iron-tetraphenylporphyrin was dissolved in acetone. The content of iron-tetraphenylporphyrin in acetone was 1 g/L. The resulting solution of macrocyclic compound was stirred. The carbon supporting titanium dioxide obtained in (1) was added into the solution while stirring. Then deionized water was added to the said solution while stirring. The volume ratio of the deionized water to the organic solvent was 1:5. After filtration, the filtered product was washed with deionized water and then was vacuum dried. The mass percentage of the active carbon in the final carbon supporting titanium dioxide-transition metal macrocyclic compound product was 60% while the mass ratio of the transition metal macrocyclic compound to the titanium dioxide was 1:3.

(3) Treatment of carbon supporting titanium dioxide-transition metal macrocyclic compound: The product obtained in (2) was thermally treated at 700° C. in the atmosphere of argon for 2 hours to obtain the composite catalyst of carbon supporting titanium dioxide-transition metal macrocyclic compound. The activity of the composite catalyst was measured by half-cell method with a rotating circular electrode at room temperature and was found to be roughly identical to that of the corresponding transition metal macrocyclic compound catalyst. At 0.45V vs NHE, the current of oxygen reduction obtained by the composite catalyst was higher than that of the corresponding macrocyclic compound catalyst. In addition, the current decay with time of the composite catalyst was slower than that of the corresponding macrocyclic compound catalyst.

Example 2

Example 2 was carried out as in Example 1 except that the content of the active carbon in the titanium dioxide sol was 10 g/L, the macrocyclic compound was cobalt-phthalocyanine and was present in the organic solvent at an amount of 5 g/L, and the volume ratio of the deionized water to the organic solvent was 5:1. The finally obtained carbon supporting titanium dioxide-transition metal macrocyclic compound contained 80% by weight of the active carbon. The mass ratio of the transition metal macrocyclic compound to titanium dioxide was 10:1. The resulting product was thermal treated at 1100° C. under the nitrogen atmosphere for 4 hours.

The activity of the composite catalyst was measured by half-cell method with a rotating circular electrode at room temperature and was found to be roughly identical to that of the corresponding transition metal macrocyclic compound. At 0.45V vs NHE, the current obtained by the composite catalyst was higher than that of the corresponding macrocyclic compound. In addition, the change of current with time was smoother than that of the macrocyclic catalyst.

Example 3

Example 3 was carried out as in Example 1 except that the content of the active carbon in the titanium dioxide sol was 30 g/L, the macrocyclic compound was zinc-tetracarboxylphthalocyanine and was present in the organic solvent at an amount of 0.5 g/L, and the volume ratio of the deionized water to the organic solvent was 1:2. The finally obtained carbon supporting titanium dioxide-transition metal macrocyclic compound contained 40% by weight of the active carbon. The mass ratio of the transition metal macrocyclic compound to titanium dioxide was 1:2. The resulting product was thermal treated at 100° C. for 0.5 hours.

The activity of the composite catalyst was measured by half-cell method with a rotating circular electrode at room temperature and was found to be roughly identical to that of the corresponding transition metal macrocyclic compound. At 0.45V vs NHE, the current obtained by the composite catalyst was higher than that of the corresponding macrocyclic compound. In addition, the change of current with time was smoother than that of the macrocyclic catalyst.

Example 4

Example 4 was carried out as in Example 1 except that the content of the active carbon in the titanium dioxide sol was 15 g/L, the macrocyclic compound was copper-tetraphenylporphyrin and was present in the organic solvent at an amount of 0.1 g/L, and the volume ratio of the deionized water to the organic solvent was 1:1. The finally obtained carbon supporting titanium dioxide-transition metal macrocyclic compound contained 70% by weight of the active carbon. The mass ratio of the transition metal macrocyclic compound to titanium dioxide was 2:1. The resulting product was thermal treated at 300° C. for 2 hours.

The activity of the composite catalyst was measured by half-cell method with a rotating circular electrode at room temperature and was found to be roughly identical to that of the corresponding transition metal macrocyclic compound. At 0.45V vs NHE, the current obtained by the composite catalyst was higher than that of the corresponding macrocyclic compound. In addition, the change of current with time was smoother than that of the macrocyclic catalyst.

Example 5

Example 5 was carried out as in Example 1 except that the content of the active carbon in the titanium dioxide sol was 25 g/L, the transition metal macrocyclic compound was manganese-Schiff base and was present in the organic solvent at an amount of 2 g/L, and the volume ratio of the deionized water to the organic solvent was 2:1. The finally obtained carbon supporting titanium dioxide-transition metal macrocyclic compound contained 40% by weight of the active carbon. The mass ratio of the transition metal macrocyclic compound to titanium dioxide was 4:1. The resulting product was thermal treated at 400° C. for 3 hours.

The activity of the composite catalyst was measured by half-cell method with a rotating circular electrode at room temperature and was found to be roughly identical to that of the corresponding transition metal macrocyclic compound. At 0.45V vs NHE, the current obtained by the composite catalyst was higher than that of the corresponding macrocyclic compound. In addition, the change of current with time was smoother than that of the macrocyclic catalyst.

Example 6

Example 6 was carried out as in Example 1 except that the macrocyclic compound was iron-diphenyl-tetranitrogen annulene and was present in the anhydrous pyridine as organic solvent at an amount of 3 g/L, and the volume ratio of the deionized water to the organic solvent was 3:1. The finally obtained carbon supporting titanium dioxide-transition metal macrocyclic compound contained 70% by weight of the active carbon. The mass ratio of the transition metal macrocyclic compound to titanium dioxide was 6:1. The resulting product was thermal treated at 500° C. for 6 hours.

The activity of the composite catalyst was measured by half-cell method with a rotating circular electrode at room temperature and was found to be roughly identical to that of the corresponding transition metal macrocyclic compound. At 0.45V vs NHE, the current obtained by the composite catalyst was higher than that of the corresponding macrocyclic compound. In addition, the change of current with time was smoother than that of the macrocyclic catalyst.

Example 7

Example 7 was carried out as in Example 1 except that the macrocyclic compound was iron-tetraphenylphthalocyanine and was present in the N,N-dimethylformamide as organic solvent at an amount of 4 g/L, and the volume ratio of the deionized water to the organic solvent was 1:1. The finally obtained carbon supporting titanium dioxide-transition metal macrocyclic compound contained 70% by weight of the active carbon. The mass ratio of the transition metal macrocyclic compound to titanium dioxide was 8:1. The resulting product was thermal treated at 900° C. for 6 hours.

The activity of the composite catalyst was measured by half-cell method with a rotating circular electrode at room temperature and was found to be roughly identical to that of the corresponding transition metal macrocyclic compound. At 0.45V vs NHE, the current obtained by the composite catalyst was higher than that of the corresponding macrocyclic compound. In addition, the change of current of the composite catalyst with time was smoother than that of the macrocyclic catalyst.

Example 8

Example 8 was carried out as in Example 1 except that the macrocyclic compound was iron-tetrasulfonicporphyrin and was present in the cyclohexane as organic solvent at an amount of 5 g/L, and the volume ratio of the deionized water to the organic solvent was 4:1. The finally obtained carbon supporting titanium dioxide-transition metal macrocyclic compound contained 70% by weight of the active carbon. The mass ratio of the transition metal macrocyclic compound to titanium dioxide was 10:1. The resulting product was thermal treated at 1000° C. for 5 hours.

The activity of the composite catalyst was measured by half-cell method with a rotating circular electrode at room temperature and was found to be roughly identical to that of the corresponding transition metal macrocyclic compound. At 0.45V vs NHE, the current obtained by the composite catalyst was higher than that of the corresponding macrocyclic compound. In addition, the change of current of the composite catalyst with time was smoother than that of the macrocyclic catalyst.

Example 9

Example 9 was carried out as in Example 1 except that the transition metal macrocyclic compound was cobalt-tetracarboxylphthalocyanine and was present in the dimethylsulfoxide as organic solvent at an amount of 0.3 g/L, and the volume ratio of the deionized water to the organic solvent was 1.5:1. The finally obtained carbon supporting titanium dioxide-transition metal macrocyclic compound contained 70% by weight of the active carbon. The mass ratio of the transition metal macrocyclic compound to titanium dioxide was 1:3. The resulting product was thermal treated at 450° C. for 3 hours.

The activity of the composite catalyst was measured by half-cell method with a rotating circular electrode at room temperature and was found to be roughly identical to that of the corresponding transition metal macrocyclic compound. At 0.45V vs NHE, the current obtained by the composite catalyst was higher than that of the corresponding macrocyclic compound. In addition, the change of current of the composite catalyst with time was smoother than that of the macrocyclic catalyst.

Example 10

Example 10 was carried out as in Example 1 except that the mass ratio of the transition metal macrocyclic compound to titanium dioxide was 1:1.

The activity of the composite catalyst was measured by half-cell method with a rotating circular electrode at room temperature and was found to be roughly identical to that of the corresponding transition metal macrocyclic compound. At 0.45V vs NHE, the current obtained by the composite catalyst was higher than that of the corresponding macrocyclic compound. In addition, the change of current of the composite catalyst with time was smoother than that of the macrocyclic catalyst.

Example 11

Example 11 was carried out as in Example 1 except that the mass ratio of the transition metal macrocyclic compound to titanium dioxide was 3:1.

The activity of the composite catalyst was measured by half-cell method with a rotating circular electrode at room temperature and was found to be roughly identical to that of the corresponding transition metal macrocyclic compound. At 0.45V vs NHE, the current obtained by the composite catalyst was higher than that of the corresponding macrocyclic compound. In addition, the change of current of the composite catalyst with time was smoother than that of the macrocyclic catalyst.

Example 12

Example 12 was carried out as in Example 1 except that the mass ratio of the transition metal macrocyclic compound to titanium dioxide was 10:1.

The activity of the composite catalyst was measured by half-cell method with a rotating circular electrode at room temperature and was found to be roughly identical to that of the corresponding transition metal macrocyclic compound. At 0.45V vs NHE, the current obtained by the composite catalyst was higher than that of the corresponding macrocyclic compound. In addition, the change of current of the composite catalyst with time was smoother than that of the macrocyclic catalyst.

Example 13

Example 13 was carried out as in Example 1 except that the carbon supporting titanium dioxide-transition metal macrocyclic compound contained 40% by weight of the active carbon. The mass ratio of the transition metal macrocyclic compound to titanium dioxide was 1:3.

The activity of the composite catalyst was measured by half-cell method with a rotating circular electrode at room temperature and was found to be roughly identical to that of the corresponding transition metal macrocyclic compound. At 0.45V vs NHE, the current obtained by the composite catalyst was higher than that of the corresponding macrocyclic compound. In addition, the change of current of the composite catalyst with time was smoother than that of the macrocyclic catalyst.

Example 14

Example 14 was carried out as in Example 1 except that the carbon supporting titanium dioxide-transition metal macrocyclic compound contained 40% by weight of the active carbon and the mass ratio of the transition metal macrocyclic compound to titanium dioxide was 10:1.

The activity of the composite catalyst was measured by half-cell method with a rotating circular electrode at room temperature and was found to be roughly identical to that of the corresponding transition metal macrocyclic compound. At 0.45V vs NHE, the current obtained by the composite catalyst was higher than that of the corresponding macrocyclic compound. In addition, the change of current of the composite catalyst with time was smoother than that of the macrocyclic catalyst.

Example 15

Example 15 was carried out as in Example 1 except that the carbon supporting titanium dioxide-transition metal macrocyclic compound contained 80% by weight of the active carbon. The mass ratio of the transition metal macrocyclic compound to titanium dioxide was 1:3.

The activity of the composite catalyst was measured by half-cell method with a rotating circular electrode at room temperature and was found to be roughly identical to that of the corresponding transition metal macrocyclic compound. At 0.45V vs NHE, the current obtained by the composite catalyst was higher than that of the corresponding macrocyclic compound. In addition, the change of current of the composite catalyst with time was smoother than that of the macrocyclic catalyst.

Example 16

Example 16 was carried out as in Example 1 except that the carbon supporting titanium dioxide-transition metal macrocyclic compound contained 80% by weight of the active carbon. The mass ratio of the transition metal macrocyclic compound to titanium dioxide was 1.5:1.

The activity of the composite catalyst was measured by half-cell method with a rotating circular electrode at room temperature and was found to be roughly identical to that of the corresponding transition metal macrocyclic compound. At 0.45V vs NHE, the current obtained by the composite catalyst was higher than that of the corresponding macrocyclic compound. In addition, the change of current of the composite catalyst with time was smoother than that of the macrocyclic catalyst.

What is claimed is:

1. A method of preparing non-platinum composite electrocatalyst for a fuel cell cathode, comprising:

(1) preparing a carbon supporting titanium dioxide;

(2) compounding the carbon supporting titanium dioxide with a transition metal macrocyclic compound in an organic solvent to produce a carbon supporting titanium dioxide-transition metal macrocyclic compound comprising 0.1–5 g/L of macrocyclic compound; and (3) thermal treating the resulting compound in step (2) at 100–1000° C. to produce a composite catalyst.

2. The method as claimed in claim 1, wherein the organic solvent in step (2) is N,N-dimethylformamide, dimethylsulfoxide, cyclohexane, acetone or anhydrous pyridine.

3. The method as claimed in claim 1, wherein the center metal ion of the transition metal macrocyclic compound in step (2) is selected from a group consisting of iron, cobalt, manganese, copper and zinc.

4. The method as claimed in claim 1, wherein the transition metal macrocyclic compound is selected from a group consisting of porphyrin, phthalocyanine, Schiff base, annulene and derivatives thereof.

5. The method as claimed in claim 1, wherein the product obtained in step (3) contains 40–80% by weight of the active carbon, and wherein the mass ratio of the transition metal macrocyclic compound to titanium dioxide is 1–10:3-1.

6. The method as claimed in claim 1, wherein the inert gas used in step (3) is argon or nitrogen gas.

7. The method as claimed in claim 1, wherein the step (1) comprising the following substeps:

(1) slowly adding tetrabutyl titanate into anhydrous alcohol while vigorously stirring at room temperature to obtain a homogeneous and transparent solution;

(2) adding nitric acid into a mixture of deionized water and anhydrous alcohol to obtain a solution (B); and (3) slowly adding the solution (A) into the solution (B) while vigorously stirring to obtain a homogeneous and transparent sol.

* * * * *